United States Patent
Calsoyds et al.

(12) 
(10) Patent No.: US 6,595,578 B1
(45) Date of Patent: Jul. 22, 2003

(54) TRUCK AFTER-BODY DRAG REDUCTION DEVICE

(76) Inventors: Kyril Calsoyds, 9975 Chestnut Rd., Flagstaff, AZ (US) 86004; David G. Calley, 10220 Cjervo Tr., Flagstaff, AZ (US) 86004

( * ) Notice: Subject to any disclaimer, the term of this patent is extended or adjusted under 35 U.S.C. 154(b) by 0 days.

(21) Appl. No.: 10/235,900

(22) Filed: Sep. 5, 2002

(51) Int. Cl.7 .............................................. B62D 35/00
(52) U.S. Cl. .................................................. 296/180.4
(58) Field of Search ........................ 296/180.1, 180.4; 180/903; 105/1.1

(56) References Cited

U.S. PATENT DOCUMENTS

| | | | | |
|---|---|---|---|---|
| 3,697,120 A | * | 10/1972 | Saunders | 296/180.4 |
| 4,601,508 A | * | 7/1986 | Kerian | 296/180.4 |
| 4,682,808 A | * | 7/1987 | Bilanin | 296/180.4 |

* cited by examiner

*Primary Examiner*—Dennis H. Pedder
(74) *Attorney, Agent, or Firm*—Frank C. Price

(57) ABSTRACT

To reduce the air drag on a moving truck-trailer a structure is mounted on the rear end of the trailer in a shape to encourage air penetration into the low pressure region behind the moving trailer by creating twin flows of air that fill the region directly behind the trailer. This inhibits the formation of vortices and reduces the severity of low pressure in the region. The basic form of the structure is a hollow pyramid with an open top and with its base against the rear trailer wall. There are two, open, side-by-side, deep, rectilinear cups with rounded bottoms facing rearward inside the hollow pyramid.

4 Claims, 5 Drawing Sheets

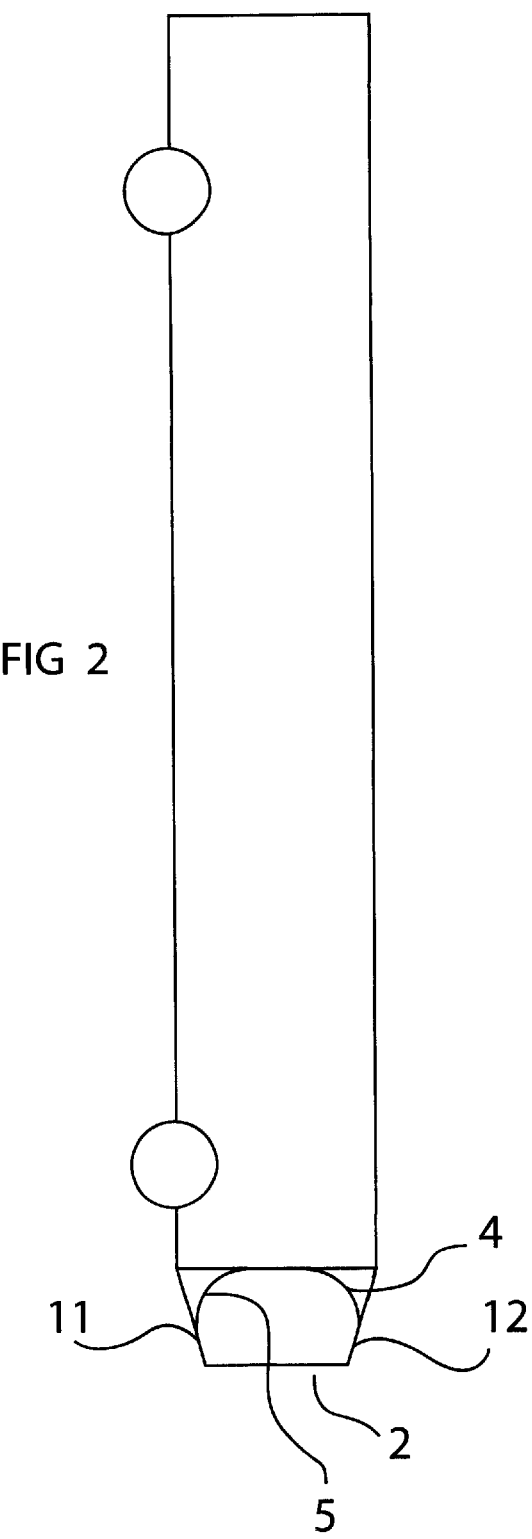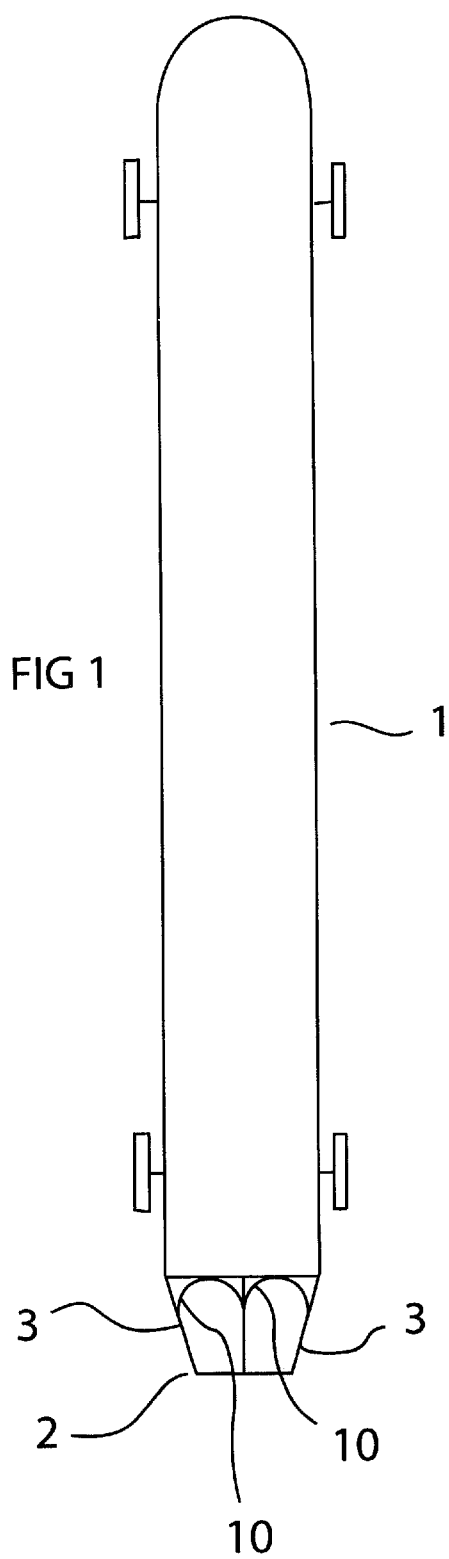
FIG 2
FIG 1

TRUCK AFTER-BODY DRAG REDUCTION DEVICE

BACKGROUND OF THE INVENTION

There are dozens of patents for different configurations mounted on the flat end of a large truck trailer to decrease the air drag of the moving trailer. The main object always is to fill in the low pressure region in the vicinity of the rear vertical surface. Actually, a portion of the pressure drop at the rear surface is contributed to by the organization of the air flow streaming rearward, i.e., following the truck end. The flows from the sides, the top and the bottom inward tend to create a vortice in the wake region of the trailer. This strengthens the suction drag (low pressure) at the rear compared to a wake without the vortices Each of the many patented inventions cover ways to influence air motion at the rear of the trailer. Our invention specifically obviates the vortices formation. It does this by means of air foils of minimum complexity.

SUMMARY OF THE INVENTION

The invention is essentially a truncated, four-sided, hollow pyramid with the base closely matching the perimeter of the rear vertical surface of the trailer. The pyramid is divided internally, vertically into two chambers with vertical walls that are curved, in effect, to form two adjacent "U" shaped cavities with the open ends facing rearward. This shape facilitates the development of rear air flow forward within the pyramid from the vertical edges and into each "U" shape including an 180 degree turn rearward, behind and away from the trailer in non-rotating flow retreating behind the moving trailer. The depth of the "U" shaped cavities can be less than the overall height of the truncated pyramid. In another form of the invention each "U" has a vertical splitter wall extending from the rear of the apparatus forward into each "U" approximately three-fourths of the depth of the "U" in order to reduce air entrainment between the entering and exiting streams of air in each cavity.

BRIEF DESCRIPTION OF THE DRAWINGS

FIG. 1 is a plan view of a trailer with the apparatus in cross section showing the double "U" of the internal shape.

FIG. 2 is an elevation view of FIG. 1 in a cross section of the apparatus taken at the center of one "U".

DETAILED DESCRIPTION

Figure 3:
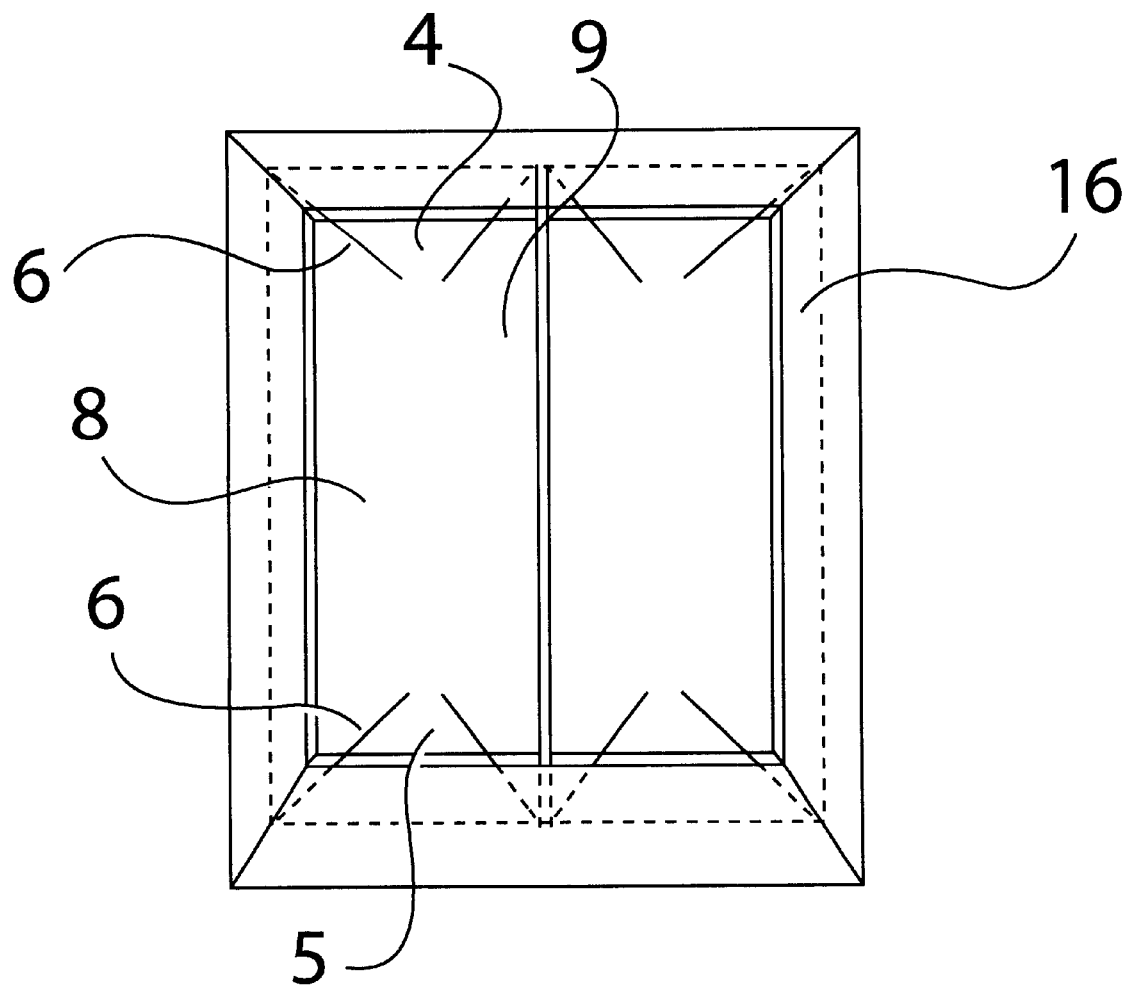
FIG. 3 is rear view of the apparatus illustrating the center vertical divider wall and the pyramid shape as seen from the "top" or forward end of the pyramid. The cavity does not take up the full depth of the pyramid.

In FIG. 1 can be seen the trailer 1 with the drag reducer 2 installed at the trailer's rear end, the vertical-straight outer side panel 3 is canted inwardly and the "U" shaped inner surfaces 10. This is essentially a hollow, truncated pyramid 2 on its side with its base attached to the vertical rear surface of the trailer. The apparatus itself is seen in cross section. The rear surface of the trailer can serve as the base of the pyramid.

FIG. 2 illustrates for the drag reducer 2, the curves of the top and bottom inner surfaces 4 and 5 and the outer top and bottom panels 11 and 12 canted inwardly.

Figure 4:
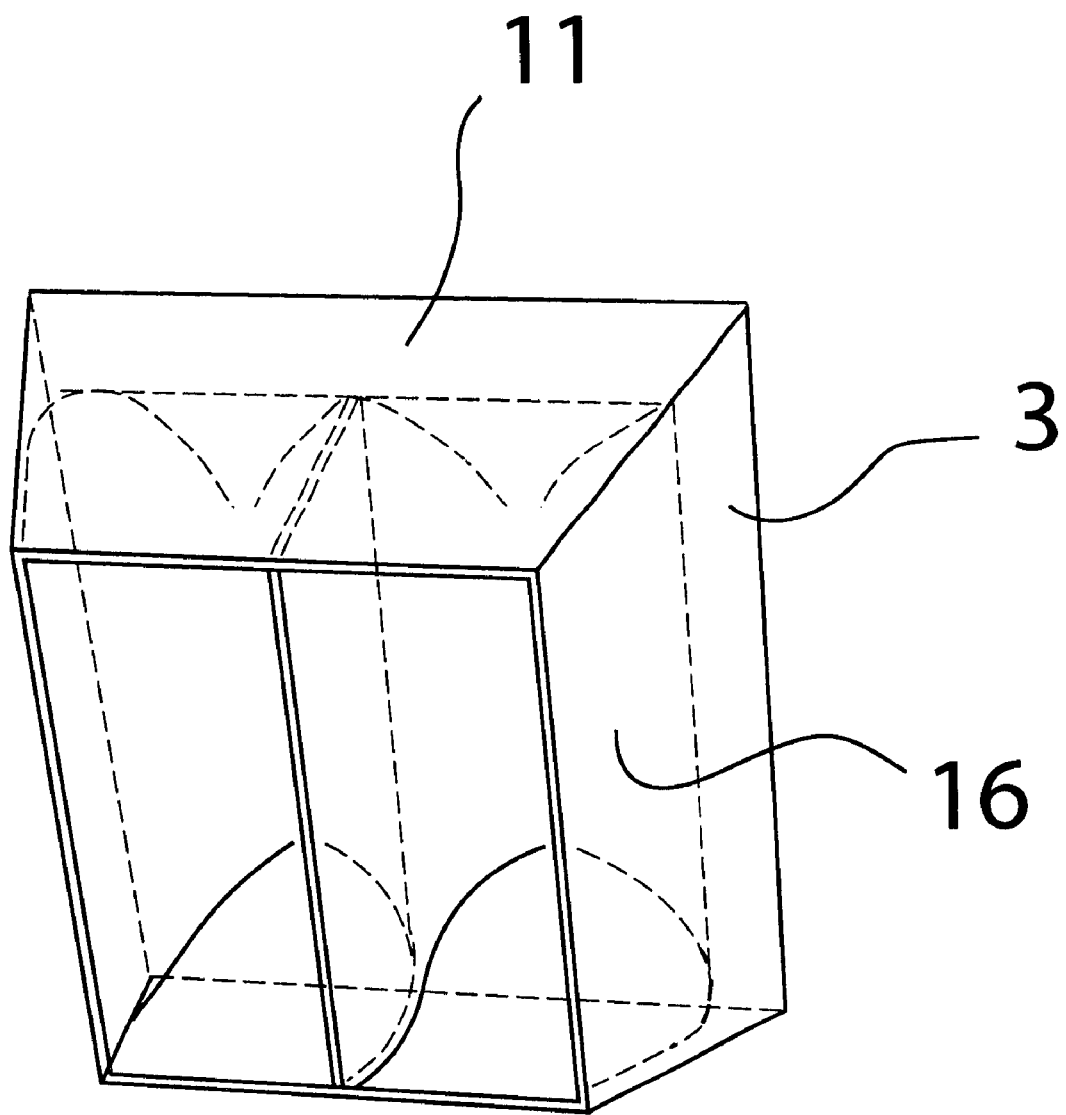
FIG. 4 is an isometric view of FIG. 3.

FIG. 3 shows the intersection lines 6 of the top and bottom inner curved-surfaces 4 and 5 with the side-inner curved surfaces 8 and 9. The overall internal surface of the unit includes vertical curved surfaces at the sides and downward/upward curved surfaces intersecting them at their bottom and top regions. This is an example of having only partial forward penetration of the pyramid by the recirculating air flow, there being a false bottom 16 inside the pyramid FIG. 4 is an isometric view of FIG. 3 with the outer, straight panels 3 and 11.

Figure 5:
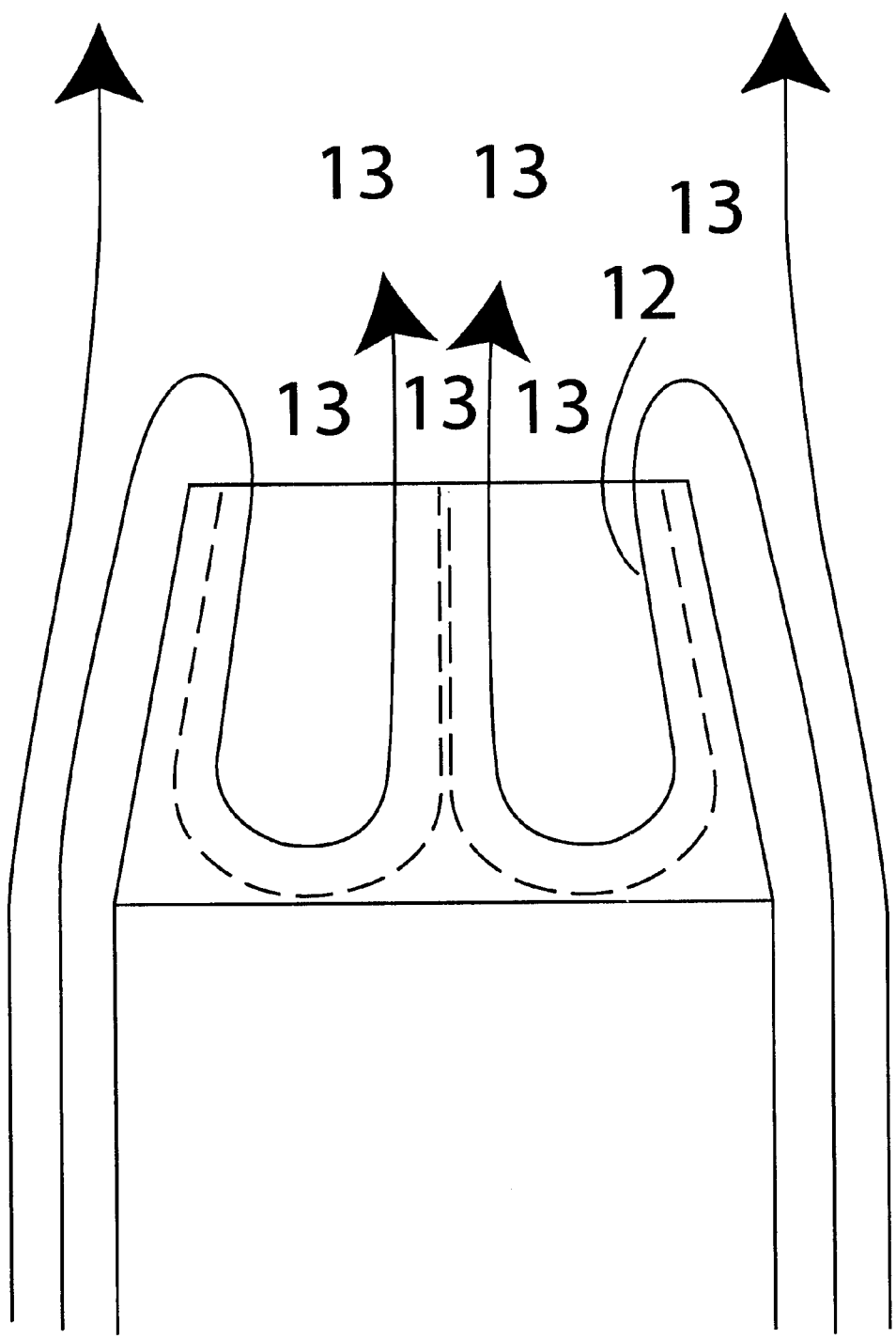
FIG. 5 is a cross section for the case of the cavities extending the full depth of the pyramid, showing the structure of the air flow into and out of the cavities.

FIG. 5 shows diverted slip stream air 12 from off the side of the trailer flowing into the apparatus and back out to fill in the region 13 where a vortex tends, otherwise, to reside and attach itself to the rear of the trailer. With this invention the air flows straight back from the trailer without whirling into a vortex. This effects less pressure drop at the rear of the trailer.

Figure 6:
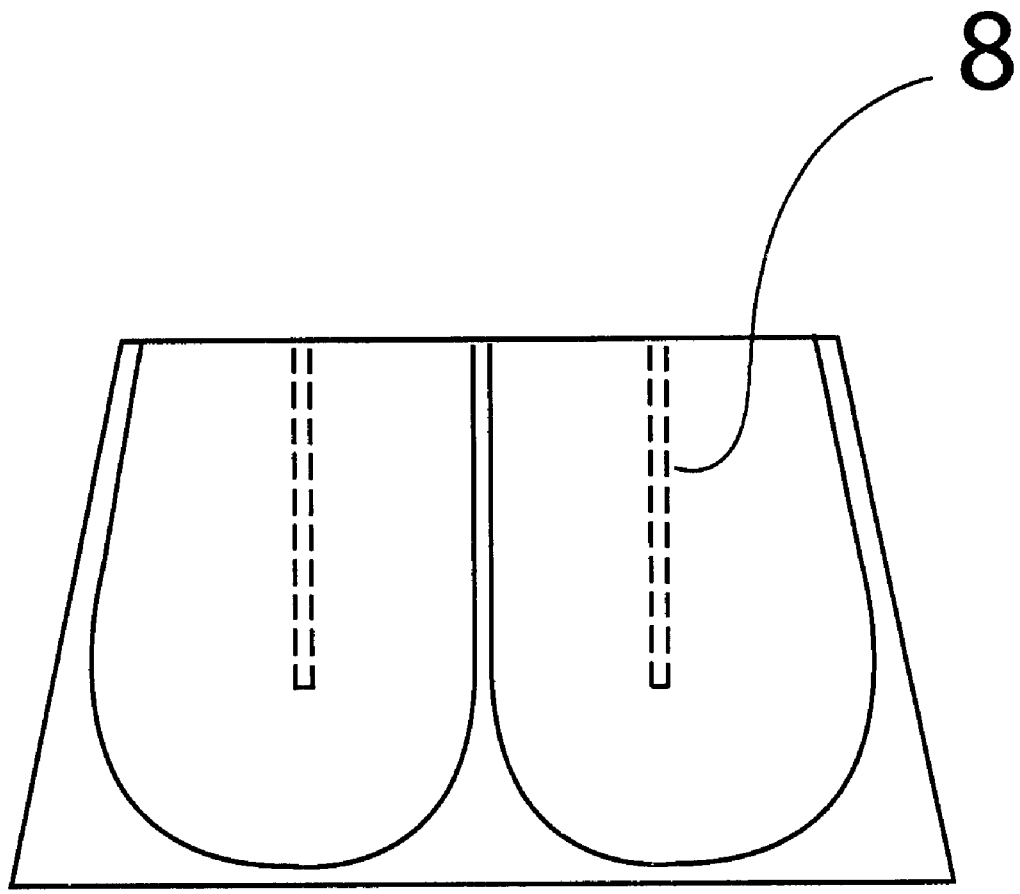
FIG. 6 corresponds to FIGS. 1, 2 and 5 with partial vertical vanes installed in the center of each of the two "U".

FIG. 6 shows the vertical vanes 8 installed to separate the air flow streams into and out of the apparatus.

The optimum end effect requires the combination of the pyramid depth and the angle of it's sides. Yet, only a partial penetration of the hollow pyramid by the recirculating flow describes an embodiment which potentially has the most effect on the air flow at the rear of the trailer. This configuration with more shallow "U" shaped cavities-15 resting on bulkhead 14 can effect a more efficient flow of air into and out of the hollow pyramid and a more efficient recirculating flow of air into the region directly behind the trailer, that flow preventing the vortice formation.

The basic creative bent of this invention is the organization of air flow at the rear of the trailer into a non-whirling stream that fills in the vacuum created by the moving trailer such that the vacuum is minimized and the resulting drag on the trailer is less. Various modifications to the depths and angles used to construct our basic apparatus should result in simply a varied embodiment of our invention.

We claim:

1. A structure mounted on the rear vertical surface of a truck trailer for the purpose of reducing the velocity-induced air drag of said trailer, said drag associated with air circulation behind the trailer and its attendant low pressure, comprising:

an apparatus made of straight and curved material to form a hollow, four-sided, truncated pyramid, with lower edges said pyramid installed against said rear vertical surface, and the height of said pyramid extending in a horizontal direction, said pyramid open on its rearward end, said pyramid divided vertically, internally into two mirror-imaged parts, each part having four interior walls slanted inward and forwardly from said rearward end and curving toward each other at their forward extremities inside the pyramid forming two cup shaped cavities.

2. The apparatus of claim 1 including a vertical wall dissecting each said mirror-imaged part, said wall extending from the rearward end of the apparatus to a distance less than said height, said dissecting wall separating the entering and exiting air streams.

3. The apparatus of claim 1 wherein the depth of said cup shaped cavities is less than the height of the truncated pyramid.

4. The apparatus of claim 1 in which the trailer rear vertical surface serves as the base of said pyramid.

* * * * *

UNITED STATES PATENT AND TRADEMARK OFFICE
CERTIFICATE OF CORRECTION

PATENT NO. : 6,595,578 B1
DATED : July 22, 2003
INVENTOR(S) : Kyril Calsoyas

It is certified that error appears in the above-identified patent and that said Letters Patent is hereby corrected as shown below:

<u>Title page,</u>
Item [76], Inventors, first inventor's name should read -- Kyril Calsoyas --

Signed and Sealed this

Twenty-fifth Day of November, 2003

JAMES E. ROGAN
*Director of the United States Patent and Trademark Office*